(12) United States Patent
SanFacon et al.

(10) Patent No.: US 9,964,692 B2
(45) Date of Patent: May 8, 2018

(54) ILLUMINATED FEATURE FOR AN LED LUMINAIRE

(71) Applicant: Focal Point, LLC, Chicago, IL (US)

(72) Inventors: Michael David SanFacon, Naperville, IL (US); Michael Scott Garner, North Barrington, IL (US); Krutin S. Desai, Chicago, IL (US); Ken Czech, Naperville, IL (US)

(73) Assignee: Focal Point, LLC, Chicago, IL (US)

( * ) Notice: Subject to any disclaimer, the term of this patent is extended or adjusted under 35 U.S.C. 154(b) by 153 days.

(21) Appl. No.: 14/876,772

(22) Filed: Oct. 6, 2015

(65) Prior Publication Data

US 2017/0097460 A1    Apr. 6, 2017

(51) Int. Cl.
*F21V 8/00*    (2006.01)

(52) U.S. Cl.
CPC ......... *G02B 6/0088* (2013.01); *G02B 6/0035* (2013.01); *G02B 6/0058* (2013.01); *G02B 6/0065* (2013.01); *G02B 6/0068* (2013.01); *F21V 2200/00* (2015.01); *F21V 2200/20* (2015.01); *G02B 6/0078* (2013.01); *G02B 6/0096* (2013.01)

(58) Field of Classification Search
CPC .. G02B 6/0011; G02B 6/0028; G02B 6/0078; F21V 2200/20
See application file for complete search history.

(56) References Cited

U.S. PATENT DOCUMENTS

| 5,575,549 | A  | * | 11/1996 | Ishikawa | G02B 6/0025 |
| | | | | | 362/330 |
| 5,704,703 | A  | * | 1/1998  | Yamada   | G01D 11/28 |
| | | | | | 349/65 |
| 6,296,372 | B1 | * | 10/2001 | Rhomberg | F21S 8/06 |
| | | | | | 362/217.07 |
| 6,945,668 | B1 | * | 9/2005  | Orlov    | F21S 8/04 |
| | | | | | 362/147 |

(Continued)

FOREIGN PATENT DOCUMENTS

DE        102008014317 A1 *  9/2009  ............... F21S 8/06

*Primary Examiner* — Jong-Suk (James) Lee
*Assistant Examiner* — Conlin Cattanach
(74) *Attorney, Agent, or Firm* — Banner & Witcoff, Ltd.

(57) ABSTRACT

Aspects of this invention relate to a system that provides an illuminated feature for an LED luminaire that can be used with opposite linear runs of LEDs to light the edges or sides of a luminaire without requiring additional LEDs. The system may include a light guide assembly located along an end housing of a light fixture, the light guide assembly including a light guide with a light guide end located proximate to one or more captured LEDs from a first plurality of LEDs located along a first side housing of the light fixture, and another light guide end located proximate to one or more captured LEDs from a second plurality of LEDs located along a second side housing of the light fixture, wherein the light guide receives the light from the one or more captured LEDs from the first plurality of LEDs and the one or more captured LEDs from the second plurality of LEDs and projects the light through the light guide, wherein when covered by a lens, the light emitted (Continued)

from the light guide is equivalent in appearance to the light emitted from the first plurality of LEDs and the second plurality of LEDs.

16 Claims, 13 Drawing Sheets

(56) References Cited

U.S. PATENT DOCUMENTS

| | | | | |
|---|---|---|---|---|
| 8,622,599 B2* | 1/2014 | Kim | ............... | G02B 6/0023 362/600 |
| 8,764,216 B2* | 7/2014 | Caferro | ............... | F21V 29/004 362/148 |
| 9,366,799 B2* | 6/2016 | Wilcox | ............... | F21S 8/061 |
| 9,476,552 B2* | 10/2016 | Myers | ............... | F21S 8/026 |
| 2007/0047255 A1* | 3/2007 | Wang | ............... | G02B 6/0091 362/609 |
| 2007/0133193 A1* | 6/2007 | Kim | ............... | E04B 9/32 362/147 |
| 2009/0316396 A1* | 12/2009 | Tsai | ............... | F21K 9/00 362/235 |
| 2010/0321952 A1* | 12/2010 | Coleman | ............... | F21S 8/04 362/607 |
| 2011/0205758 A1* | 8/2011 | Kim | ............... | F21S 8/04 362/609 |
| 2012/0020109 A1* | 1/2012 | Kim | ............... | F21S 2/005 362/606 |
| 2012/0127756 A1* | 5/2012 | Kim | ............... | G02B 6/0055 362/612 |
| 2013/0027635 A1* | 1/2013 | Urano | ............... | G02B 6/0065 349/65 |
| 2013/0155723 A1* | 6/2013 | Coleman | ............... | G02B 6/0018 362/621 |
| 2014/0036503 A1* | 2/2014 | Olsen | ............... | F21S 8/026 362/249.02 |
| 2014/0126243 A1* | 5/2014 | Blessitt | ............... | G02B 6/0091 362/612 |
| 2014/0268766 A1* | 9/2014 | Lu | ............... | F21V 21/30 362/249.1 |
| 2014/0307473 A1* | 10/2014 | Chen | ............... | G02B 6/0068 362/613 |
| 2014/0313776 A1* | 10/2014 | Grigore | ............... | G02B 6/0091 362/612 |
| 2015/0070932 A1* | 3/2015 | Kim | ............... | G02B 6/0028 362/610 |

* cited by examiner

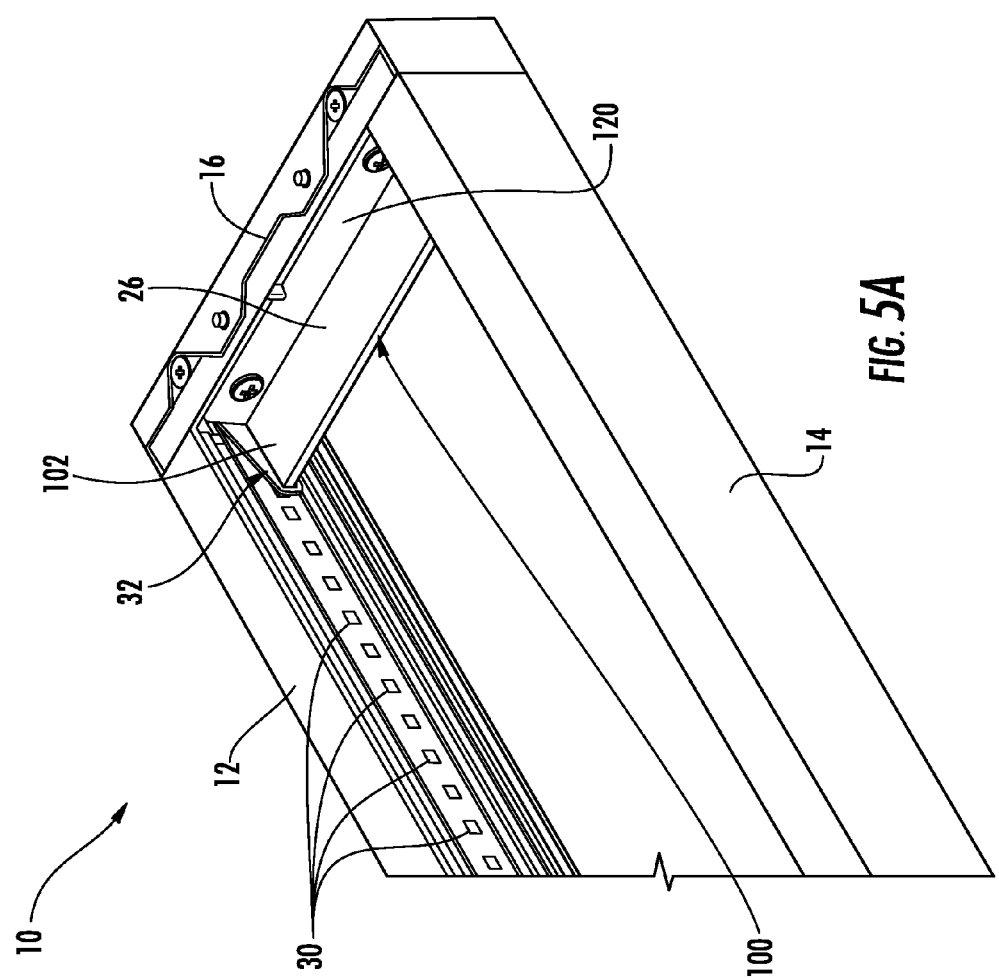

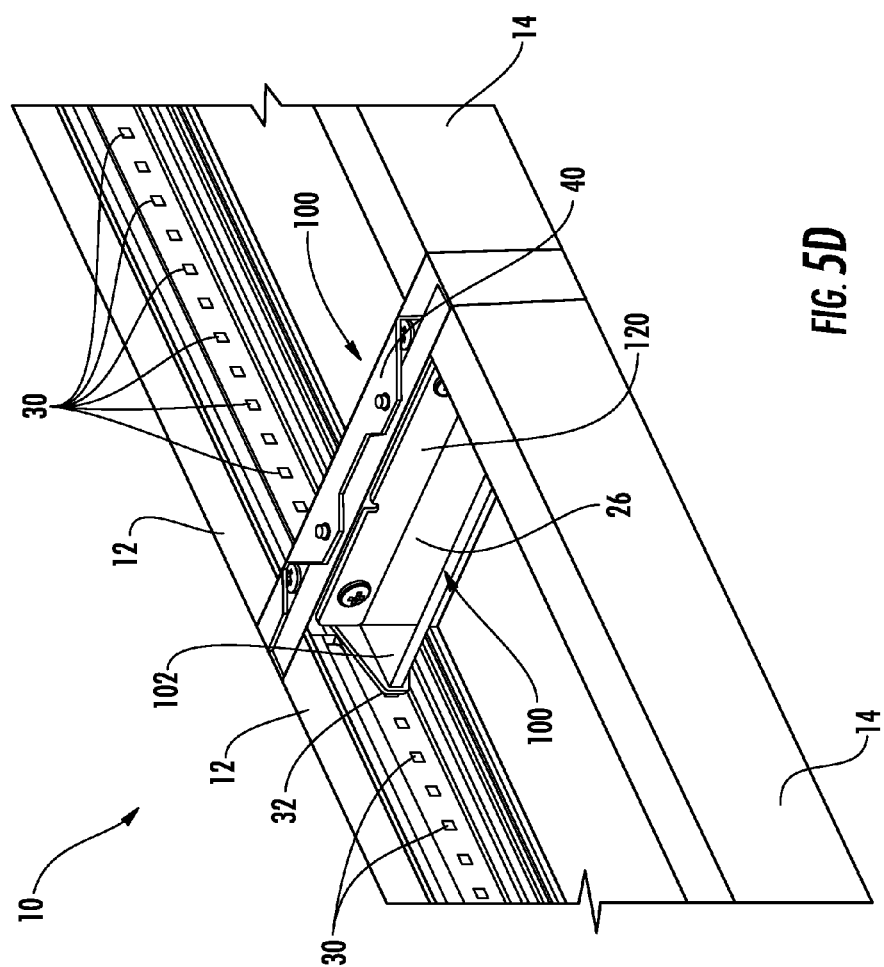

ILLUMINATED FEATURE FOR AN LED LUMINAIRE

BACKGROUND

LED lighting systems and LED luminaires may come in a variety of sizes and shapes. Some luminaires may have linear arrays of LEDs, thereby providing light in a linear direction. Some luminaires may have an array of LEDs along only one side or only opposite sides of the luminaire. These luminaires may not have arrays of LEDs along all sides of the luminaire. However, it may be desirable for the LED lighting systems or LED luminaires to require light along multiple sides or multiple sections of the luminaire. A lighting solution that can be used with opposite linear arrays of LEDs may be desirable to light the edges or sides of a luminaire without requiring additional LEDs.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relates to: a light fixture, comprising: a housing that includes and is formed by a first side housing, a second side housing opposite the first side housing, a first end housing, and a second end housing; a first plurality of LEDs located along the first side housing; a second plurality of LEDs located along the second side housing; and a light guide assembly located along the first end housing. The light guide assembly may include a light guide bracket attached to the first end housing and a light guide secured to the light guide bracket. The light guide may have a first end and a second end. The first end of the light guide may be located proximate to one or more captured LEDs from the first plurality of LEDs. The second end of the light guide may be located proximate to one or more captured LEDs from the second plurality of LEDs. The light guide may receive the light from the one or more captured LEDs from the first plurality of LEDs and the one or more captured LEDs from the second plurality of LEDs and project the light through the light guide so that the appearance of the luminaire is consistent between the sides and ends. Further, the light guide bracket may include a first bracket arm with a first slot and a second bracket arm with a second slot. The first end of the light guide may fit in the first slot and the second end of the light guide fits in the second slot. The light guide may include a protrusion that engages a slot in the light guide bracket to locate and secure the light guide in the light guide bracket and ensure proper orientation. The protrusion may be located off-center along the light guide to ensure the light guide is orientated in the light guide bracket properly.

Another aspect of this invention relates to the light guide including a top surface and a bottom surface, and the light guide including an extraction pattern located along at least a portion of one or more of the top surface and/or the bottom surface. The extraction pattern may be a textured pattern utilized to extract the light from the captured LEDs as the light pass through the light guide. The extraction pattern may be located along the top surface and the bottom surface. The extraction pattern may be produced from one or more of the following: laser-etching, embossing, injection-molding with beads, facets, prisms, or by laminating another material onto the light guide. The extraction pattern may include variable textures, wherein extraction features can be denser towards the center than on the edges thereby extracting less light closer to the edges and allowing more light to travel to the center providing uniform illumination across the surface of the light guide.

A further aspect of this invention relates to the light fixture further comprising a second light guide assembly located along the second end housing. The second light guide assembly may include a second light guide bracket attached to the second end housing, a second light guide secured to the second light guide bracket. The second light guide may have a first end and a second end. The first end of the second light guide may be located proximate to one or more second captured LEDs from the first plurality of LEDs. The second end of the second light guide may be located proximate to the one or more second captured LEDs from the second plurality of LEDs. The second light guide may receive the light from the one or more second captured LEDs from the first plurality of LEDs and the one or more second captured LEDs from the second plurality of LEDs and project the light through the second light guide, wherein the projected light from the second captured LEDs is equivalent to the light projected from the first plurality of LEDs and the second plurality of LEDs.

BRIEF DESCRIPTION OF THE DRAWINGS

The present invention is illustrated by way of example and not limited in the accompanying figures in which like reference numerals indicate similar elements and in which:

FIG. 5A illustrates a top perspective close-up view of the example embodiment of an end portion of the light fixture of FIG. 4 according to one or more aspects described herein;

FIG. 5D illustrates a top perspective view of the example embodiment of an middle portion of the light fixture of FIG. 4 according to one or more aspects described herein;

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Generally perpendicular" means that a first line, segment, plane, edge, surface, etc. is approximately (in this instance, within 5%) oriented approximately 90 degrees from another line, plane, edge, surface, etc., over at least 50% of the length of the first line, segment, plane, edge, surface, etc.

"Plurality" indicates any number greater than one, either disjunctively or conjunctively, as necessary, up to an infinite number.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope and spirit of the present disclosure.

In general, as described above, aspects of this invention relate to a system that provides an illuminated feature for an LED luminaire that can be used with opposite linear runs of LEDs to light the edges or sides of a luminaire without requiring additional LEDs. More detailed descriptions of aspects of this invention follow.

Figure 1:
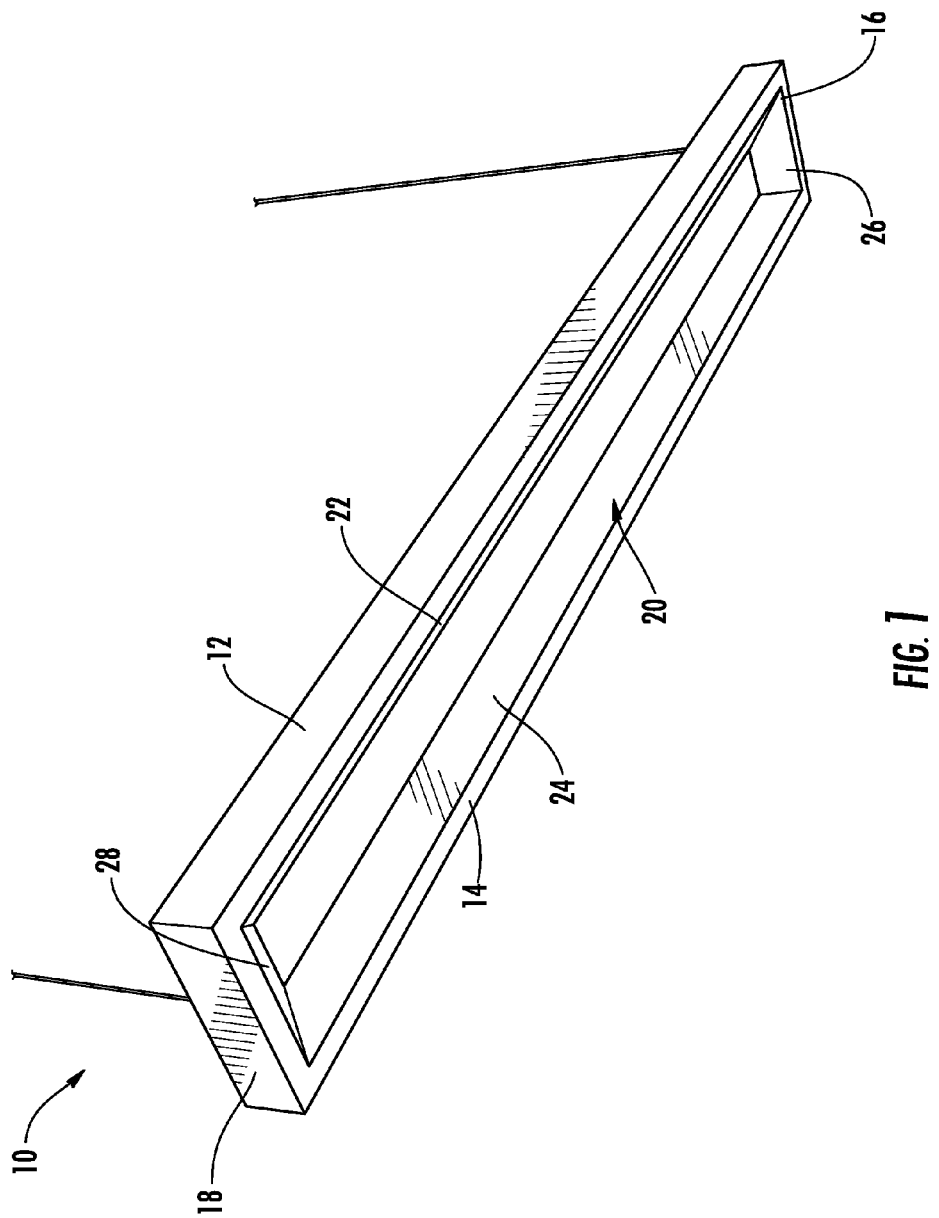
FIG. 1 illustrates an bottom perspective view of an example embodiment of a light fixture according to one or more aspects described herein.
Figure 2:
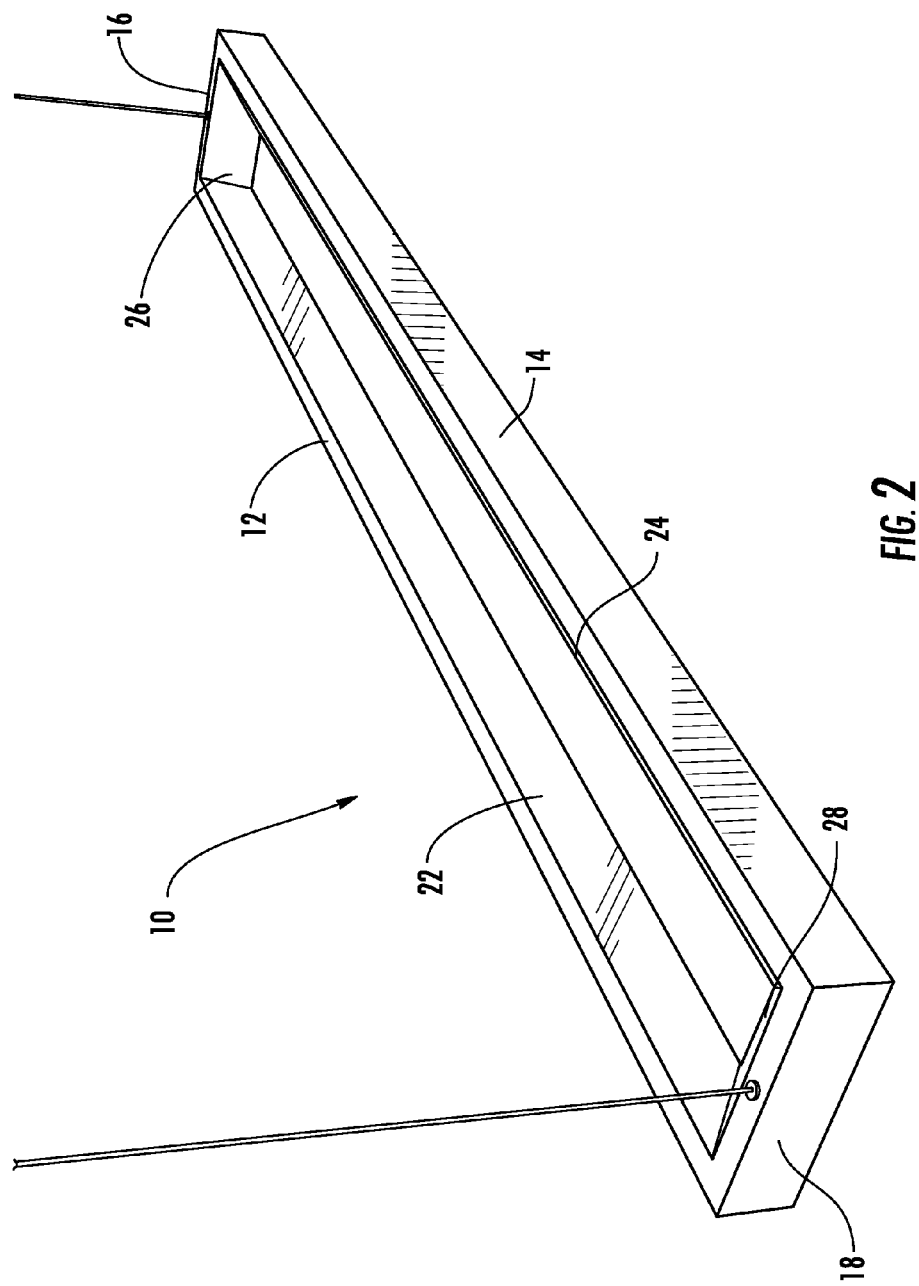
FIG. 2 illustrates a bottom perspective view of the example embodiment of the light fixture of FIG. 1 according to one or more aspects described herein.
Figure 3:
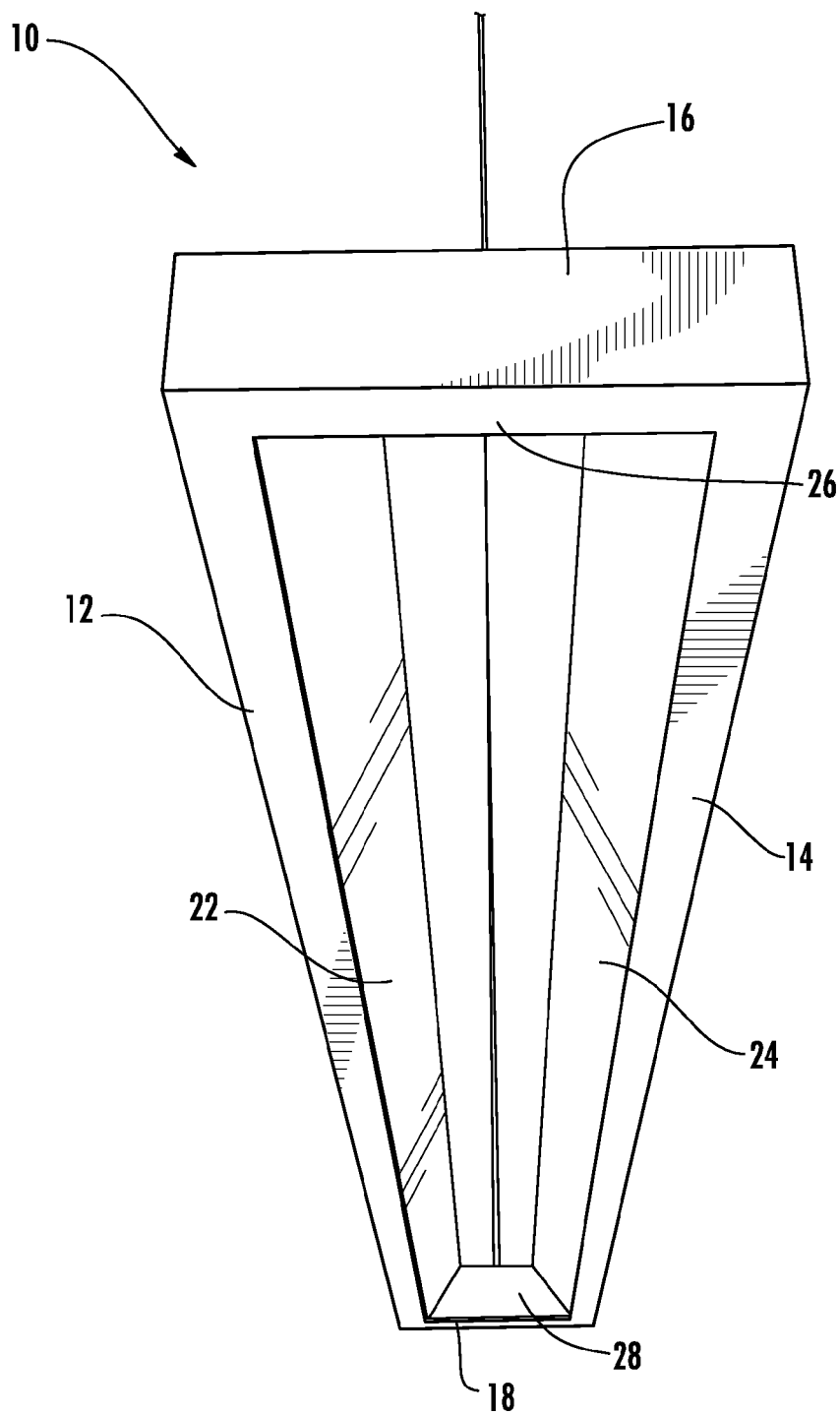
FIG. 3 illustrates a bottom view of the example embodiment of the light fixture of FIG. 1 according to one or more aspects described herein.

One aspect of this invention relates to a light guide assembly 100 that includes a light guide 102 that distributes the light from one or more LEDs 30 on one side and one or more LEDs 30 on the opposite side to project light along the light guide 102, thereby projecting light from captured LEDs and the light guide 102 such that when covered by a lens or diffuser, the appearance of the end features are the same as the sides. FIGS. 1-3 illustrate an example luminaire 10 that includes a light guide assembly 100 (light guide assembly 100 not shown in these figures as the light guide assembly is covered by the lens assembly 20).

The luminaire 10 may be rectangular in shape, such that the luminaire includes a first side housing 12, a second side housing 14 opposite the first side housing 12, a first end housing 16 and a second end housing 18 opposite the first end housing 18. The first side housing 12, second side housing 14, first end housing 16, and second end housing 18 form the rectangular housing of the luminaire 10. The luminaire 10 may also include a lens assembly 20 that is connected to the housing of the luminaire 12. The lens assembly 20 may extend around the entire interior of the luminaire 10 as illustrated in FIGS. 1-3. The lens assembly 20 may also be located in other positions around the luminaire 10 and the housing without departing from this invention. The lens assembly 20 may cover the LEDs as will be described in more detail below. The lens assembly 20 may include a first side lens 22, a second side lens 24 opposite the first side lens 22, a first end lens 26, and a second end lens 28 opposite the first end lens 26. As illustrated in FIGS. 1-3, the first side lens 22 may be attached or engaged with the first side housing 12. The second side lens 24 may be attached or engaged with the second side housing 14. The first end lens 26 may be attached or engaged with the first end housing 16. The second end lens 28 may be attached or engaged with the second end housing 18. The luminaire 10 may be other shapes without departing from this invention.

Figure 4:
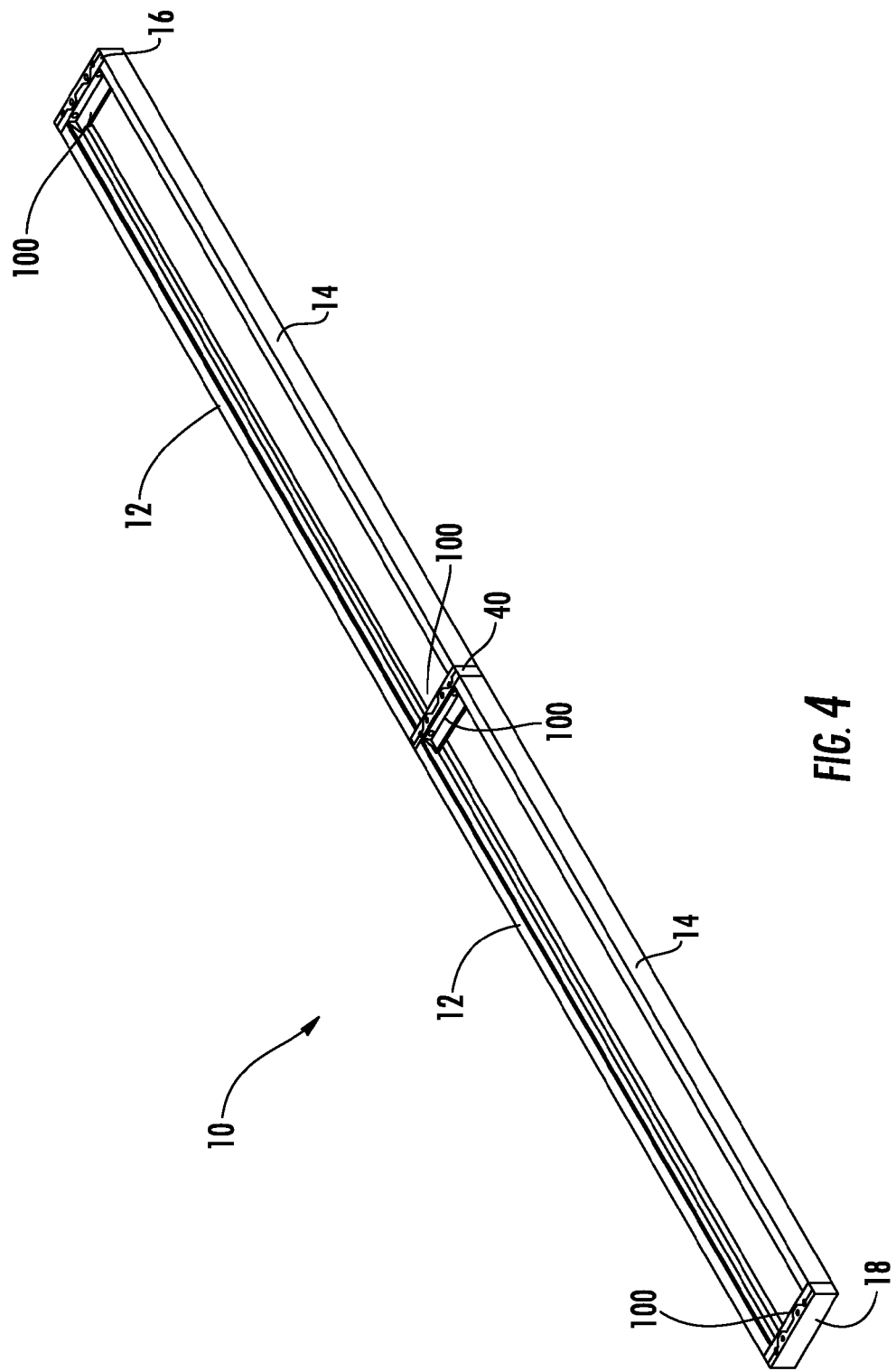
FIG. 4 illustrates a top perspective view of the example embodiment of another light fixture with portions removed to show an example embodiment of a light guide and further details according to one or more aspects described herein.

FIG. 4 illustrates an exemplary light fixture or luminaire 10 with multiple light fixtures connected together. The light fixture 10 may be in the shape of a rectangular shape (as illustrated in FIGS. 1-3). Other shapes may be utilized without departing from this invention. The light fixture 10 may include two opposing sides connected with two opposing ends and shorter end pieces. The light fixture 10 illustrated in FIG. 4 does not show the lens assembly 20 so as to better detail and show a light guide assembly 100. The light fixture of FIG. 4 shows a connector 40 connecting the two light fixtures together. As can be seen in FIG. 4, the light guide assembly 100 may be located on each of the opposing ends of the light fixture 10.

FIGS. 5A-5C and 5E illustrate a close-up views of the end of the light fixture 10 illustrated in FIG. 4. FIG. 5D illustrates a close-up view of the connector 40 area of the light fixture 10. The LEDs 30, 32 as illustrated may be oversized to better illustrate this invention. The scale of the LEDs with regards to the light fixture 10 may be varied without departing from this invention. As shown in FIGS. 5A through 5E, the light fixture 10 includes a light guide assembly 100 on the two opposing ends of the light fixture 10. Specifically, FIGS. 5A-5C and 5E illustrate the light guide assembly 100 located at the end of the light fixture 10. Specifically, FIG. 5D illustrates another embodiment, wherein the light guide assembly 100 may also be located at a middle of multiple light fixtures 10.

As illustrated in FIGS. 5A through 5E, the light guide assembly 100 may include both a light guide 102 and a light guide bracket 120. The light guide 102 may be attached or secured to the light guide bracket 120 with the light guide bracket 120 attached or secured to light fixture 10. The light guide bracket 120 may be attached or secured to the first end housing 16 or the second housing 18. The light guide bracket 120 may also be attached or secured to the connector 40 or a portion of the connector 40.

Figure 5B:
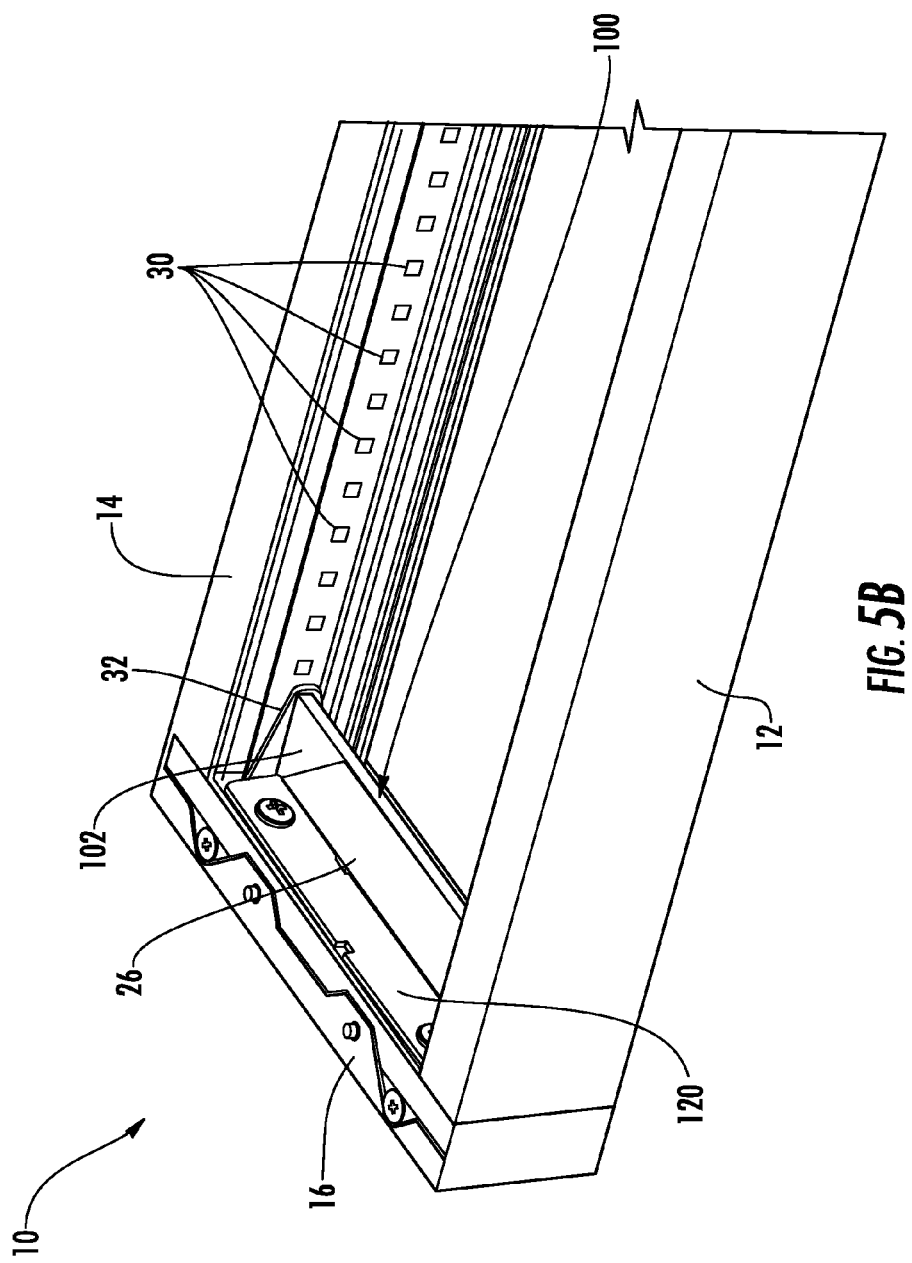
FIG. 5B illustrates another top perspective close-up view of the example embodiment of the end portion of the light fixture of FIGS. 4 and 5A according to one or more aspects described herein.
Figure 5C:
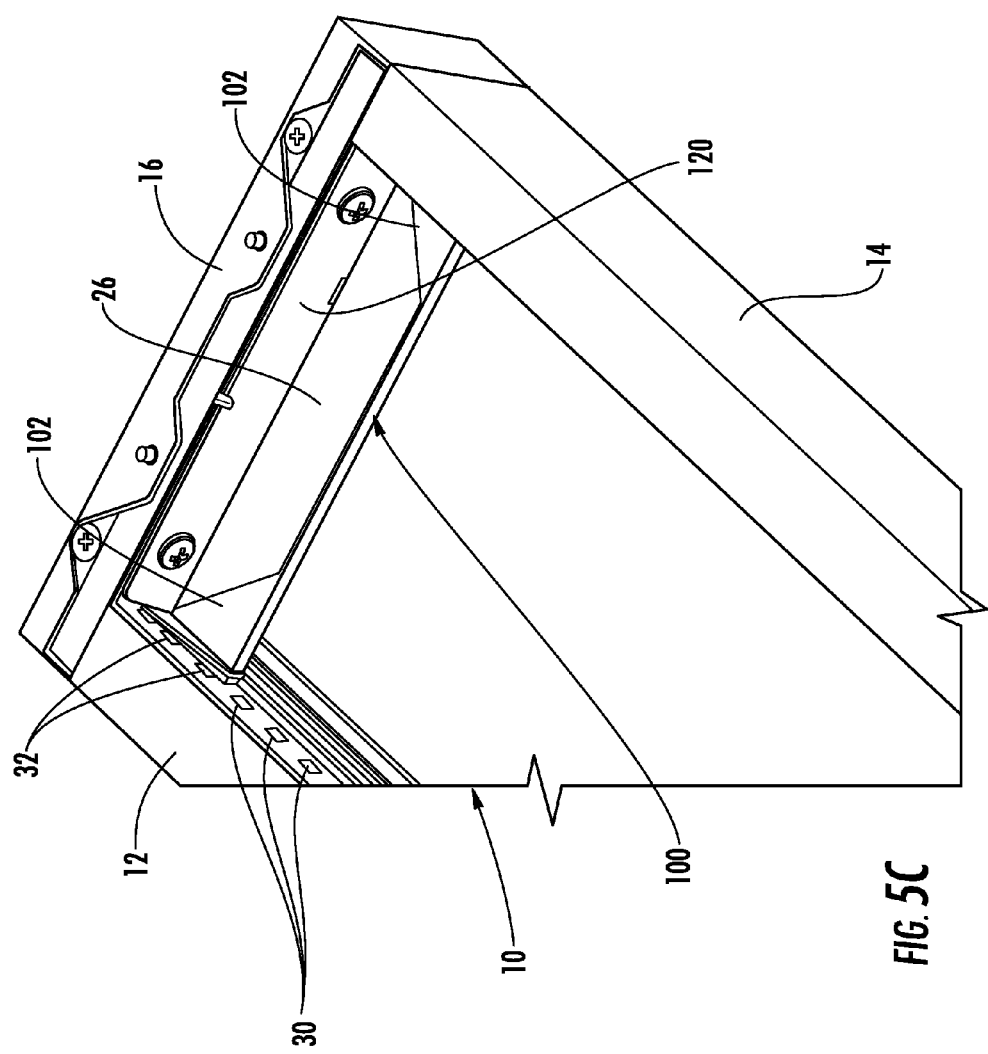
FIG. 5C illustrates another top perspective close-up view of the example embodiment of the end portion of the light fixture of FIGS. 4 and 5A according to one or more aspects described herein.
Figure 5E:
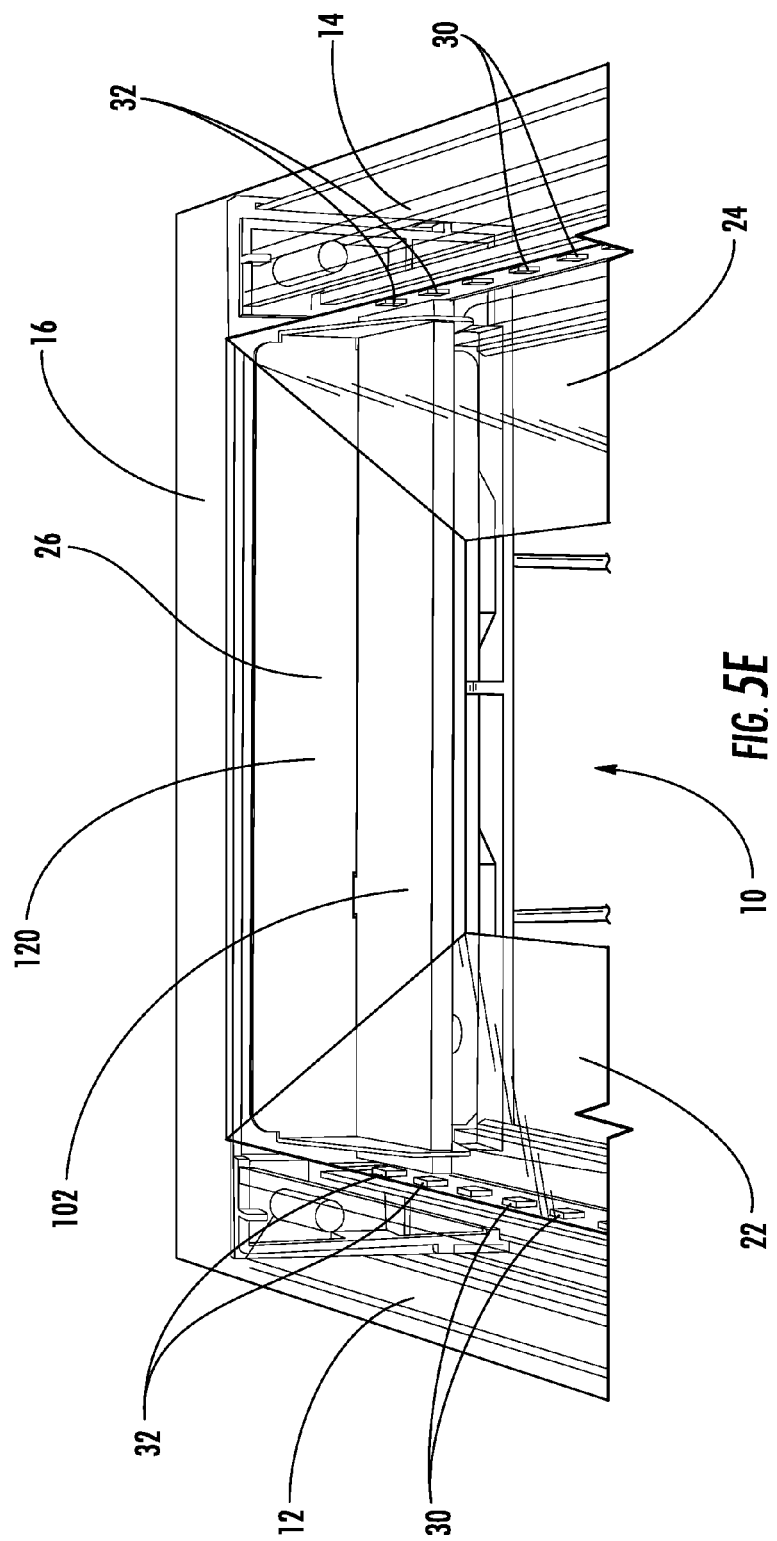
FIG. 5E illustrates another top perspective close-up view of the example embodiment of the end portion of the light fixture of FIGS. 4 and 5A according to one or more aspects described herein.

As illustrated in FIGS. 5A, 5C, 5D, and 5E, the light fixture 10 may include an LED circuit with a plurality of LEDs 30 spaced along the first side housing 12. As illustrated specifically in FIG. 5B, the plurality of LEDs 30 may also be spaced along the second side housing 14. The plurality of LEDs 30 may be spaced along both the first side housing 12 and the second side housing 14. However, LEDs 30 are not located along the first end housing 16 or the second end housing 18. The light guide 102 may be located and positioned such that the light guide 102 is adjacent to at least one or more captured LEDs 32 (the adjacent LEDs are designated with reference number 32). Note—the captured LEDs may also be located along both the first side housing 12 (as shown in FIG. 5C) and the second side housing 14 (not shown because of the perspective angle of the figures). For example, as illustrated in FIGS. 5C and 5E, two captured LEDs 32 are located adjacent to each of the light guide ends 104 and the edges of the light guide 102. As illustrated in FIG. 5D, one captured LED 32 is located adjacent to each of the edges of the light guide 102. One or more captured LEDs 32 may be located adjacent to each of the light guide ends 104 and the edges of the light guide 102. The light guide 102 may then distribute the light from the one or more adjacent captured LEDs 32 across the light guide 102 to project light along the first and second end housings 16, 18 and through the first and second end lens 26, 28. The distributed and projected light from the adjacent captured LEDs 32 across the light guide 102 may light the first and second side lens 22, 24. The light projected from the adjacent captured LEDs 32 and from the light guide 102 may be equivalent to the light projected from the one or more LEDs 30 located along the first and second side housings 12, 14 and through the first and second side lens 22, 24.

Figure 6:
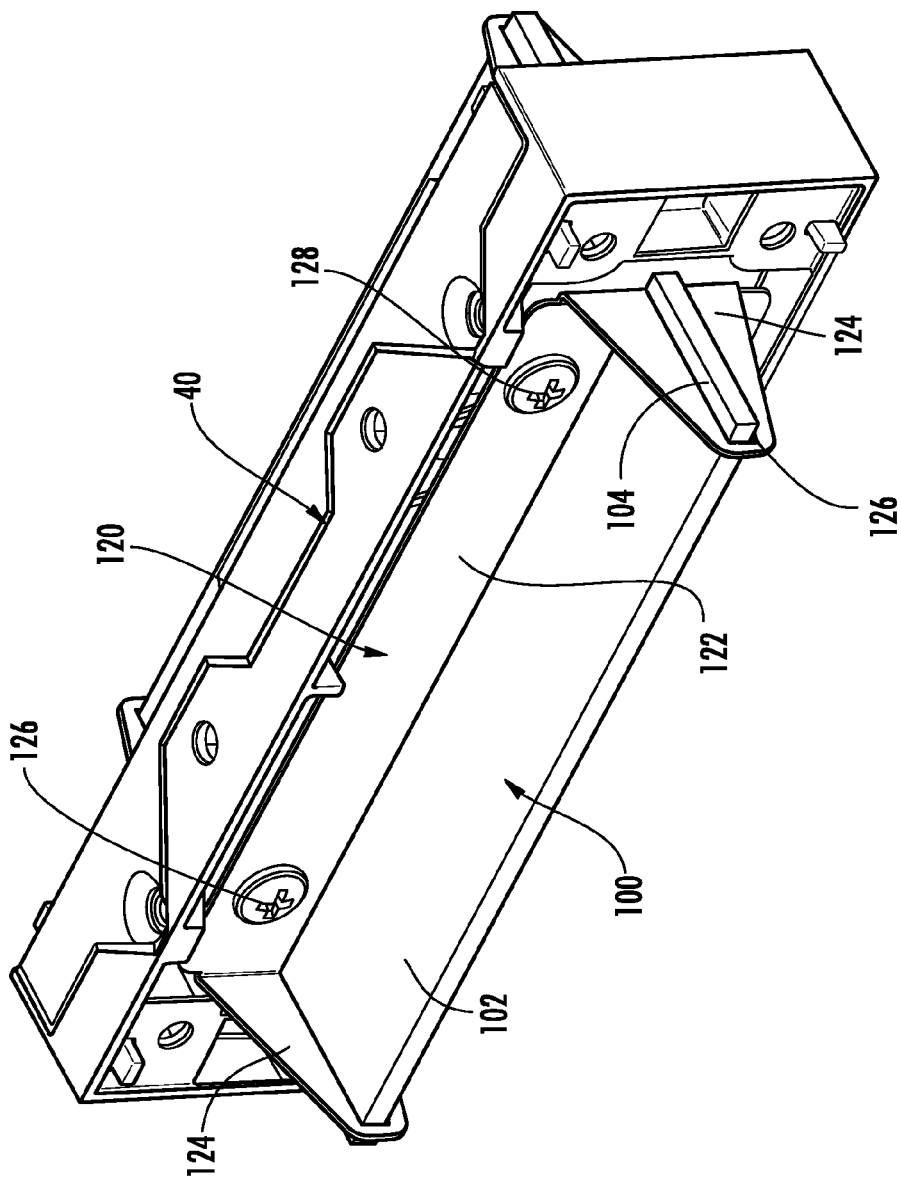
FIG. 6 illustrates a perspective view of the exemplary light guide and bracket of the light fixture of FIG. 4 according to one or more aspects described herein.
Figure 7:
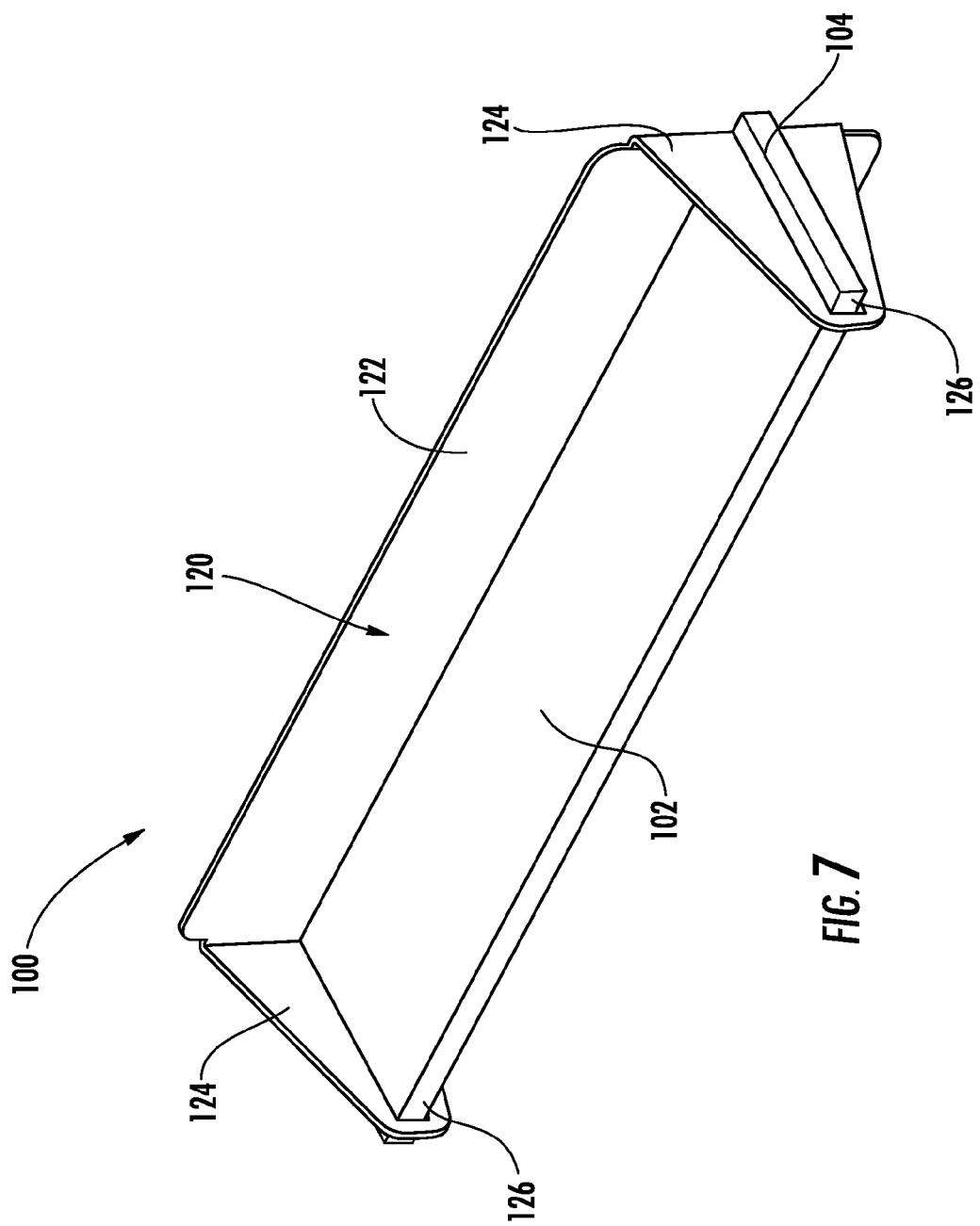
FIG. 7 illustrates another perspective view of the exemplary light guide and bracket of the light fixture of FIG. 4 according to one or more aspects described herein.

FIGS. 6 and 7 illustrate perspective views of the exemplary light guide 102 and light guide bracket 120 of the light fixture 100. The light guide 102 may be attached or secured to the light guide bracket 120. As illustrated in FIGS. 6 and 7, the light guide bracket 120 may include a bracket base 122 and bracket arms 124 that extend in a general perpendicular direction from the bracket base 122. The bracket arms 124 may also include a slot 126 that may be sized and shaped to receive the light guide 102. The light guide 102 may include ends 104 that may fit in the slot 126. The slot 126 may hold the light guide end 104.

Figure 8A:
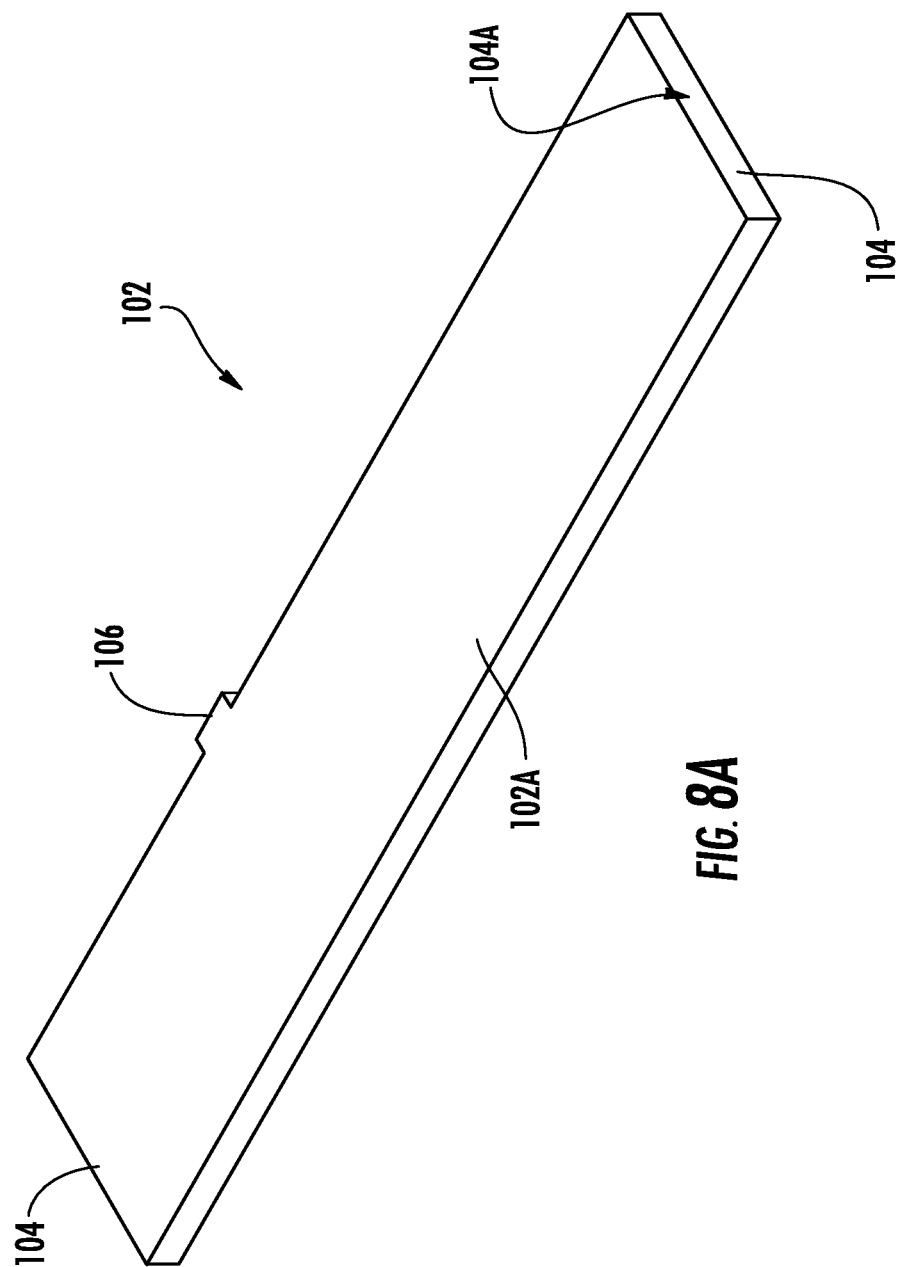
FIG. 8A illustrates a perspective view of the exemplary light guide of the light fixture of FIG. 4 according to one or more aspects described herein.
Figure 8B:
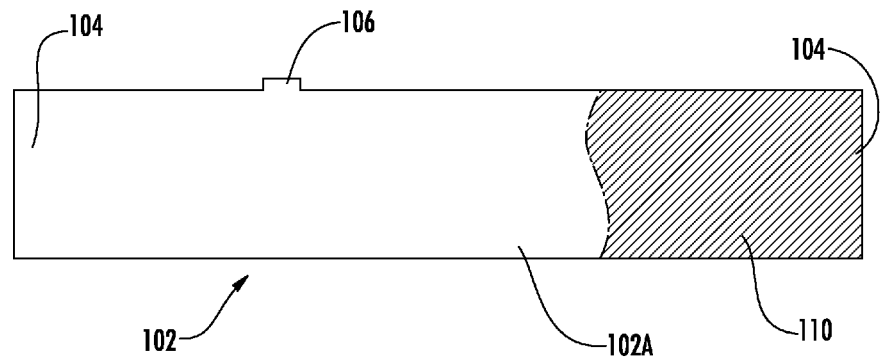
FIG. 8B illustrates a top view of the exemplary light guide of the light fixture of FIG. 4 according to one or more aspects described herein.
Figure 8C:
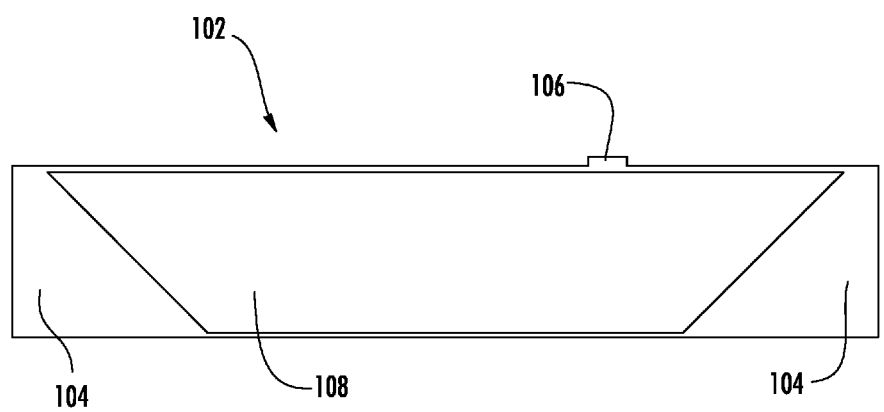
FIG. 8C illustrates a bottom view of the exemplary light guide of the light fixture of FIG. 4 according to one or more aspects described herein.

Additionally, in accordance with aspects of this invention, the light guide 102 may include a protrusion 106 (as detailed and explained with FIGS. 8A-8C). The protrusion 106 may sized and shaped to fit into a slot in the bracket base 122 to secure and properly locate the light guide 102 in the light guide bracket 120. The protrusion 106 may also be located off-center on light guide 102 so that the light guide 102 can only be oriented in one way when located in the light guide bracket 120. The light guide 102 may have a top and bottom that makes it important to be oriented in the correct manner in the light guide bracket 120.

In accordance with aspects of this invention, one or more of the bracket arms 124 may be bendable or movable such that the light guide 102 can be installed into the light guide bracket 120 easily. In one aspect of this invention, one of the bracket arms 124 may be bent downward to allow the light guide 102 and the light guide end 104 to be placed in the opposite side slot 126, ensuring the protrusion 106 fits inside the slot on the bracket base 122. After the light guide 102 and light guide end 104 are secured in the opposite side slot 126, the bended bracket arm 124 may be bended up to secure the other light guide end 104 in the other slot 126 to secure the light guide 102 into the light guide bracket 120.

Additionally, as illustrated in FIG. 6, the light guide bracket 120 attached or secured to light fixture 10. The light guide bracket 120 may be attached or secured to the first end housing 16 or the second housing 18. The light guide bracket 120 may also be attached or secured to the connector 40 or a portion of the connector 40. As illustrated in FIG. 6, the light guide bracket 120 may include one or more securing members 128. The securing members 128 may be screws or other similar-type securing members without departing from this invention. The securing member 128 may be located at the bracket base 122, thereby attaching the light guide bracket 120 to the first end housing 16, the second end housing 18, or the connector 40.

FIGS. 8A-8C illustrate views of the exemplary light guide 102 of the light fixture 10. The light guide 102 may include a base surface 102A, a first and second end 104, and a protrusion or tab 106. As illustrated in FIG. 8C, the bottom view of the light guide 102, the light guide 102 and the base surface 102A may include an extraction pattern 108. The extraction pattern 108 may be a textured pattern utilized to extract the light from the captured LEDs 32 as the light passes through the light guide 102. The extraction pattern 108 may be a variety of forms and shapes without departing from this invention. For example, the extraction pattern 108 may be formed by laser-etching, embossed, molded with beads, facets, prisms, laminated, and/or any other known processes for forming extraction patterns. Additionally, the extraction pattern 108 may be formed on one side, on either the top or bottom side of the light guide 102. The extraction pattern 108 may also be formed on both sides (top and bottom) of the light guide 102 without departing from this invention. The extraction pattern 108 may include variable textures throughout the light guide 102. The extraction pattern 108 may also include a gradient texture, for example, extraction features can be denser towards the center than on the edges thereby extracting less light closer to the edges and allowing more light to travel to the center. This gradient texture may help to ensure uniform illumination across the light emitting portion of the light guide 102.

Additionally, as illustrated in FIG. 8B, the light guide 102 and the base surface 102A may include a reflective surface 110. The reflective surface 110 illustrated in FIG. 8B is only on a portion of the base surface 102A, however, the reflective surface 110 may extend across the entire base surface 102A and light guide 102. The reflective surface 110 may be a surface utilized to help reflect the extracted light from the captured LEDs 32 in a particular direction. The reflective surface 110 may be a variety of forms and shapes without departing from this invention. The reflective surface 110 might be applied directly to the light guide 102 or may be a separate part. For example, the reflective surface may be a film, painted, silk screen, or and/or any other known processes for producing reflective surfaces. Additionally, the reflective surface 110 may be on one side, on either the top or bottom side of the light guide 102 and base surface 102A. The reflective surface 110 may also be formed on both sides (top and bottom) of the light guide 102 without departing from this invention. The reflective surface 110 may include variable textures or reflectivity throughout the light guide 102. The reflective surface 110 may also include a gradient reflectivity, for example, with a less reflective surface located closer to the light guide ends 104, but with a more reflective surface located towards the middle of the light guide 102 and the reflective surface 110 may also a more reflective surface located closer to the light guide ends 104, but with a less reflective surface located towards the middle of the light guide 102.

Additionally, the light guide 102 may have various dimensions without departing from this invention. For example, the light guide 102 may have a length L as defined from the first end 104 to the second end 104 and as illustrated in FIG. 8A. The light guide 102 may also have a width W as defined from the front of the base surface 102A to the back to the base surface 102A as illustrated in FIG. 8A. The light guide 102 may also have a thickness T as defined from the top of the base surface 102A to the bottom of the base surface 102A as illustrated in FIG. 8A. The various dimensions of length L, width W, and thickness T, are all important variables for the design of the light guide 102. The various dimensions of length L, width W, and thickness T all may affect the light output from the light guide 102 to ensure that the light projected from the adjacent captured LEDs 32 across the light guide 102 and from the light guide 102 is equivalent to the light projected from the one or more LEDs 30 located along the first and second side housings 12, 14 and through the first and second side lens 22, 24.

As illustrated in FIGS. 8A-8C, the light guide 102 may be in the general shape of a rectangle. In other embodiments without departing from this invention, the light guide 102 may be other shapes, such as circular, oval, trapezoidal, and/or other shapes that may be contemplated and utilized.

Further, as illustrated in FIG. 8A, the light guide ends 104 may include a finished surface or face 104A. The finished surface 104A may be a polished face utilized to capture more light from the captured LEDs 32 to pass the light through the light guide 102. The finished surface 104A a variety of forms and shapes without departing from this invention. Additionally, the finished surface 104A may be formed on one light guide end 104, or formed on both light guide ends 104.

Additionally, the light guide 102 may have a protrusion or tab 106 extending generally perpendicular to the base surface 102A to assist in aligning and securing the light guide 102 to the light guide bracket 120. The protrusion 106 may have a cross-sectional shape that is symmetrical about at least one plane. For instance, the protrusion 106 may have any cross-sectional shape such as a rectangle, circle, a square, a cross, a star, or a t-shape. Additionally, the outer surfaces of the protrusion 106 may have a taper such that the cross-sectional shape becomes smaller in size as the protrusion 106 extends away from the base surface 102A. The taper may be approximately 5 degrees or in a range from a 1 degree up to 10 degrees. Alternatively, the exterior surfaces of the protrusion 106 may not have a taper.

The protrusion 106 may have any width and height. The height is defined as the dimension from the base surface 102A to the top of the protrusion 106. The height may be any approximately the same as the width, or may be larger than the width, or alternatively may be smaller than the width.

According to various aspects and embodiments, the light guide 102 may be formed of one or more of a variety of optically-clear, transparent, or near-transparent materials, such as acrylic, silicon, glass, polymers, or composites (including fiber-reinforced composites). The light guide 102 may be formed in one of a variety of configurations, without departing from the scope of the invention. It is understood that the light guide 102 may contain components made of several different materials.

The light guide 102 may be formed by various forming methods. For example, acrylic, glass, or silicon components, can be manufactured by a variety of processing techniques, such as cut from a sheet, injection molding, casting, and/or other known techniques. For example, composite components, such as carbon fiber-polymer composites, can be manufactured by a variety of composite processing techniques, such as prepreg processing, powder-based techniques, mold infiltration, and/or other known techniques. In a further example, polymer components, such as high strength polymers, can be manufactured by polymer processing techniques, such as various molding and casting techniques and/or other known techniques.

The essence of this invention is the ability to make the appearance of the end lens(es) (first end lens 26 and second end lens 28) equivalent to the side lens(es) (22, 24) both when illuminated and in the off state, thus creating a luminaire that appears to be lit equally from all four sides. There are various variables which may affect this ability to make the light projected through and from the light guide 102 equivalent to the light emitted from the one or more LEDs 30 along the first and second side housing 12, 14. For example, the size and shape of the light guide 102 may be varied, such as the length L, width W, and thickness T. The design and/or material of the lens (first end lens 26 and second end lens 28) that is located over the light guide 102 may be varied and different than the first side lens 22 and second side lens 24. The size, shape, and form of the extraction pattern 108 of the light guide may be varied to control or change the light projected from the light guide 102. The size, shape, and form of the reflective surface 110 of the light guide may be varied to control or change the light projected from the light guide 102. The light output, number, and location of the adjacent captured LEDs 32 may be varied to control or change the light projected from the light guide 102. The distance the captured LEDs 32 are from the light guide ends 104 and the light guide 102 may be varied to control or change the light projected from the light guide 102. The size, shape, and form of the polished surface 104A on the light guide ends 104 may be varied to control or change the light projected from the light guide 102.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

We claim:
1. A light fixture, comprising:
   a housing that includes and is formed by a first side housing, a second side housing opposite the first side housing, a first end housing perpendicular to the first side housing and the second side housing, and a second end housing opposite the first end housing and perpendicular to the first side housing and the second side housing;
   a first plurality of LEDs located along the first side housing and covered by a first side lens;
   a second plurality of LEDs located along the second side housing and covered by a second side lens; and
   a light guide assembly located along the first end housing, the light guide assembly including a light guide bracket attached to the first end housing, a light guide secured to the light guide bracket and covered by a first end lens, the light guide having a first end and a second end, wherein the first end of the light guide is located proximate to one or more captured LEDs from the first plurality of LEDs, and the second end of the light guide is located proximate to one or more captured LEDs from the second plurality of LEDs, wherein the light guide receives the light from the one or more captured LEDs from the first plurality of LEDs and the one or more captured LEDs from the second plurality of LEDs and projects the light through the light guide, wherein the first end lens refracts light through the light guide perpendicular to the first side housing and the second side housing and along the first end housing such that the light emitted from the light guide is equivalent in appearance to the light emitted from the first plurality of LEDs through the first side lens and the second plurality of LEDs through the second side lens.

2. The light fixture of claim 1, wherein the light guide bracket includes a first bracket arm with a first slot and a second bracket arm with a second slot.

3. The light fixture of claim 2, wherein the first end of the light guide fits in the first slot and the second end of the light guide fits in the second slot.

4. The light fixture of claim 2, wherein the first bracket arm is bendable.

5. The light fixture of claim 1, wherein the light guide includes a protrusion that engages a slot in the light guide bracket to locate and secure the light guide in the light guide bracket.

6. The light fixture of claim 5, wherein the protrusion is located off-center along the light guide to ensure the light guide is orientated in the light guide bracket properly.

7. The light fixture of claim 1, wherein the light guide includes a top surface and a bottom surface, and the light guide includes an extraction pattern located along at least a portion of one or more of the top surface of the bottom surface, wherein the extraction pattern is a textured pattern utilized to extract the light from the captured LEDs as the light pass through the light guide.

8. The light fixture of claim 7, wherein the extraction pattern is located along the top surface and the bottom surface.

9. The light fixture of claim 7, wherein the extraction pattern is formed from one or more of the following: laser-etching, embossing, injection-molding with beads, facets, prisms, or laminating.

10. The light fixture of claim 7, wherein the extraction pattern includes variable textures throughout the light guide.

11. The light fixture of claim 10, wherein the variable textures include a gradient texture with a less-textured surface located closer to the first end and the second end of the light guide and a more-textured surface located in a center of the light guide.

12. The light fixture of claim 1, wherein the light guide includes a top surface and a bottom surface, and the light guide includes a reflective surface located along at least a portion of one or more of the top surface or the bottom surface, wherein the reflective surface is a surface that reflects the extracted light from the captured LEDs in a particular direction.

13. The light fixture of claim 1, wherein the first end of the light guide and the second end of the light guide include a polished face.

14. The light fixture of claim 1, wherein the light guide is made of one or more of the following materials: acrylic, glass, silicon, polymers, or composites.

15. The light fixture of claim 1, wherein the light guide is made from an optically-clear material.

16. The light fixture of claim 1, further comprising a second light guide assembly located along the second end housing, the second light guide assembly including a second light guide bracket attached to the second end housing, a second light guide secured to the second light guide bracket and covered by a second end lens, the second light guide having a first end and a second end, wherein the first end of the second light guide is located proximate to one or more second captured LEDs from the first plurality of LEDs, and the second end of the second light guide is located proximate to the one or more second captured LEDs from the second plurality of LEDs, wherein the second light guide receives the light from the one or more second captured LEDs from the first plurality of LEDs and the one or more second captured LEDs from the second plurality of LEDs and projects the light through the second light guide, wherein the second end lens refracts light through the second light guide perpendicular to the first side housing and the second side housing and along the second end housing such that the light emitted from the second light guide is equivalent in appearance to the light emitted from the first plurality of LEDs through the first side lens and the second plurality of LEDs through the second side lens.

* * * * *